US005668537A

United States Patent [19]

Chansky et al.

[11] Patent Number: 5,668,537

[45] Date of Patent: Sep. 16, 1997

[54] THEATRICAL LIGHTING CONTROL NETWORK

[76] Inventors: Leonard M. Chansky, 12001 Falcon Ridge Way, Northridge, Calif. 91326; John W. Fuller, 2266 Norwic Pl., Altadena, Calif. 91001; Ronald A. Land, 3913 Bayside Dr., Simi Valley, Calif. 93063; Robert Whitten, 10600 Samoa Ave., Tujunga, Calif. 91042

[21] Appl. No.: 611,496

[22] Filed: Mar. 6, 1996

Related U.S. Application Data

[63] Continuation of Ser. No. 152,489, Nov. 12, 1993, abandoned.

[51] Int. Cl.[6] .......... H04Q 1/00

[52] U.S. Cl. .......... 340/825.06; 362/85; 362/268; 315/316

[58] Field of Search .......... 340/825.06; 362/85, 362/233, 268; 315/312, 316

[56] References Cited

U.S. PATENT DOCUMENTS

| | | | |
|---|---|---|---|
| 4,837,665 | 6/1989 | Hoyer et al. | 362/233 |
| 4,947,302 | 8/1990 | Callahan | 362/233 |
| 4,949,020 | 8/1990 | Wawen et al. | 315/297 |
| 4,972,125 | 11/1990 | Cunningham et al. | 315/291 |
| 4,977,484 | 12/1990 | Cunningham et al. | 361/429 |
| 5,004,957 | 4/1991 | Cunningham | 315/199 |
| 5,059,871 | 10/1991 | Pearlman et al. | 315/316 |
| 5,329,431 | 7/1994 | Taylor et al. | 362/85 |

OTHER PUBLICATIONS

*DMX512/1990 AMX192*, "The American Association of Design and Production Professionals in the Performing Arts, United States Institute for Theatre Technology, Inc.," Aug. 1990.

*Primary Examiner*—Brian Zimmerman
*Attorney, Agent, or Firm*—Marger, Johnson, McCollom & Stolowitz, P.C.

[57] ABSTRACT

A theatrical lighting control network which incorporates a local area network for communication among a number of node controllers and control consoles or devices employed in establising lighting or other effects levels in a theater, film production stage or other performance environment. Use of the network eliminates the requirements for the majority of hardwiring for interconnection of consoles and other contoller or monitoring devices to effects controller racks and provides great flexibility in location and relocation of various components of the system.

9 Claims, 7 Drawing Sheets

THEATRICAL LIGHTING CONTROL NETWORK

CROSS-REFERENCE TO RELATED APPLICATION

This is a continuation of application Ser. No. 08/152,489, filed Nov. 12, 1993 now abandoned.

BACKGROUND OF THE INVENTION

1. Field of the Invention

The present invention relates generally to the operation and control of theatrical lighting systems for lighting design and performance. More particularly, the invention employs a local area network receiving control information from master consoles and other input devices and distributing that information through node controllers connected to the network with interfaces to lighting and effects control devices, such as dimmer racks, and remote monitoring and input stations.

2. Prior Art

Theatrical lighting for live performances and movie and television production continues to increase in complexity. A typical theater employs hundreds of separate lights and lighting systems for house lights, stage lights, scenery lighting, spotlights and various special effects. Typically, individual lights or groups of lights are controlled through dimmers, which are located at remote locations from the lights for environmental considerations such as noise and temperature control. Individual dimmers are mounted in racks, which contain power and signal distribution to the individual dimmers.

Control of dimmer racks has been provided through lighting consoles, which allow adjustment of individual dimmers. Recent advances in lighting consoles have allowed flexibility in the number and use of individual controls allowing ganging of slide controls for simultaneous operation, sequencing of controls for multiple light settings and memory of various setting requirements. Master control panels have previously been wired directly to dimmers being controlled or, as a minimum, to dimmer racks, which provide signal distribution to individual dimmers. Industry standards for communication between control consoles and dimmer racks has been established by the United States Institute for Theater Technology, Inc. ("USITT"). Multiplexed data transmission of information to dimmers from controllers using analog technology has been established by the USITT in a standard designated AMX192. Similarly, digital data transmission between controllers and dimmers has been established by the USITT in a standard identified as DMX512.

Slight modifications and additions to the DMX protocols and capabilities have been made by various industry members. Colortran, Inc., for example, employs a modified DMX protocol identified as CMX.

The AMX192 and DMX512 standards provide flexibility over direct hardwired systems for individual dimmer control, however, significant limitations on the number of dimmers which may be controlled and the flexibility and timing of the control signals are present in these industry standards. While wiring requirements have been significantly reduced, AMX and DMX systems still require direct hard wiring from controllers to dimmer racks, with consequent limitation as to physical location and severe limitations on flexibility of rearrangement of dimmer rack locations and controller locations, depending on changing theater needs.

The AMX and DMX dimmer and controller standards further do not provide the capability for interactive control with feedback from the dimmer systems to controller consoles at a level necessary for enhanced lighting design and real-time control.

The present invention overcomes the shortcomings of the prior art by allowing control of a significantly expanded number of dimmers, while providing the capability for feedback control from the dimmers. Further, the system allows flexible placement of control consoles, monitoring devices and dimmer racks themselves, with minimal wiring requirements. The system remains downward compatible, allowing continued use of DMX and AMX hardware systems as elements of the network.

SUMMARY OF THE INVENTION

The theatrical lighting control network of the present invention is integrated in a local area network (LAN). The embodiments disclosed in this specification employ thin Ethernet technology, however, other standard LAN technologies are applicable. A master control console and associated display and peripheral devices provide overall control for the system. Standard DMX outputs are provided by the control console for use in hardwired dimmer racks, and communication with the LAN is provided through an integral network controller or network interface card (NIC). Individual node controllers are placed on the network at medium attachment units (MAU), available at desired locations on the coaxial cable net. The coaxial cable provides the only necessary hardwired portion of the system.

Remote display and control devices are operable through node controllers configured as peripheral node controllers (PNC). Dimmer racks are attached to node controllers configured as network protocol converters (NPC). NPCs additionally employ inputs which receive standard DMX/AMX control data, allowing interfacing of existing equipment consoles for secondary or supplemental control. NPCs provide standard outputs with DMX/AMX capability for connection to existing equipment dimmer racks. A microprocessor and memory storage capability within the NPC provide the capability to control the LAN interface, DMX/AMX hardwired inputs and DMX/AMX outputs. The internal intelligence in the NPC allows control input through the LAN, with priority determination and "pile-on" of multiple control signals received on the LAN and direct DMX/AMX control inputs. Memory is provided in the node controller for storage of multiple "looks", which define individual dimmer settings for an entire dimmer rack for each "look". Stored "looks" may be recalled to achieve desired lighting effects without the requirement for a master console operating on the LAN. The microprocessor in the NPC automatically institutes one or more prestored "looks" upon loss of signal from the master console through the LAN. Supplemental analog inputs and outputs and hardwired configuration switching enhances flexibility of the NPC for monitoring and control functionality.

System configuration is accomplished through a standard personal computer (PC) or the master console attached to the LAN for upload and download of configuration data to the node controllers.

BRIEF DESCRIPTION OF THE DRAWINGS

The features of the invention will be better understood with reference to the following drawings and detailed description.

DETAILED DESCRIPTION OF THE INVENTION

Figure 1A:
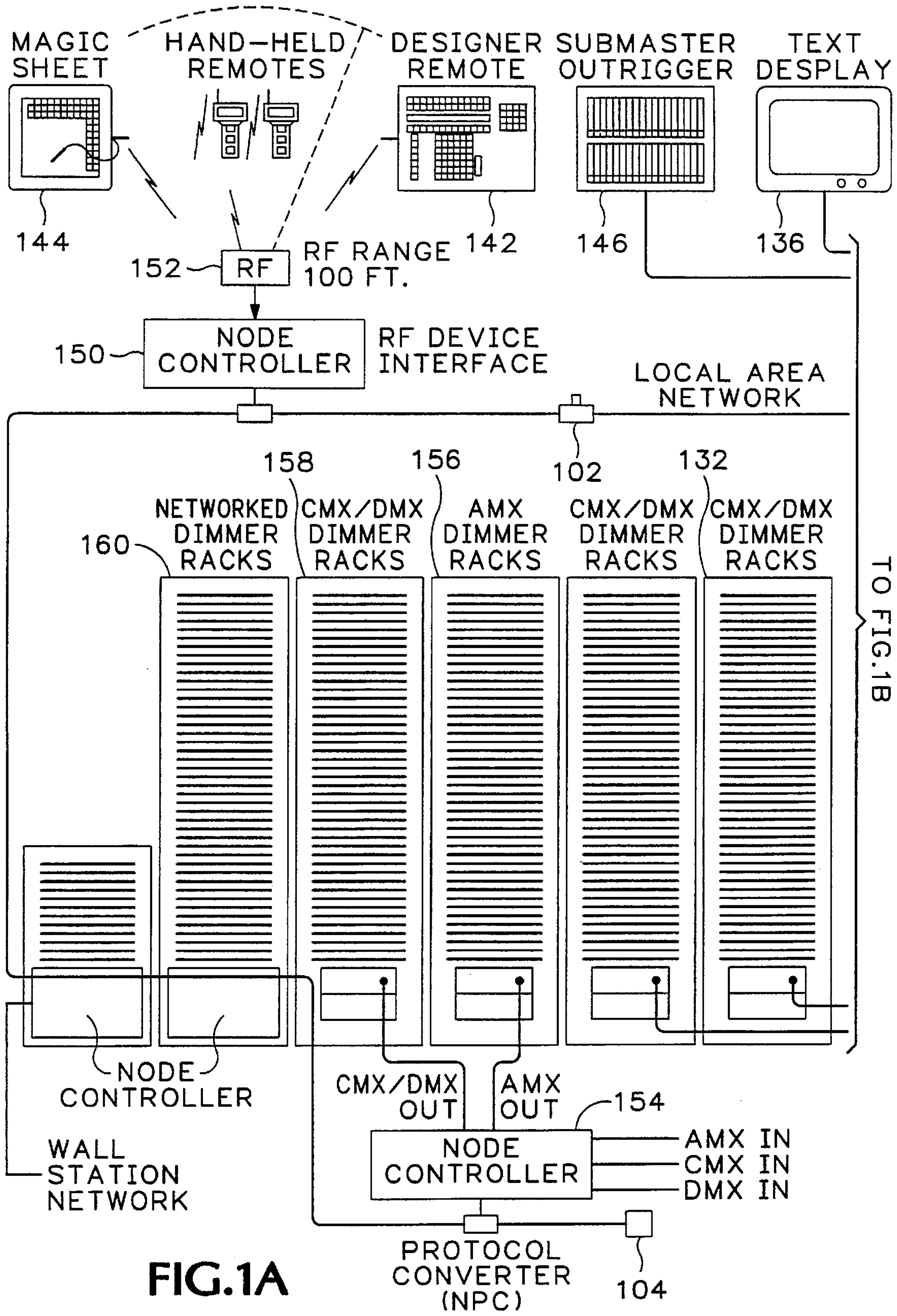
FIG. 1 is a block diagram of the overall theatrical lighting control network showing various components of a first embodiment of the system.
Figure 1B:
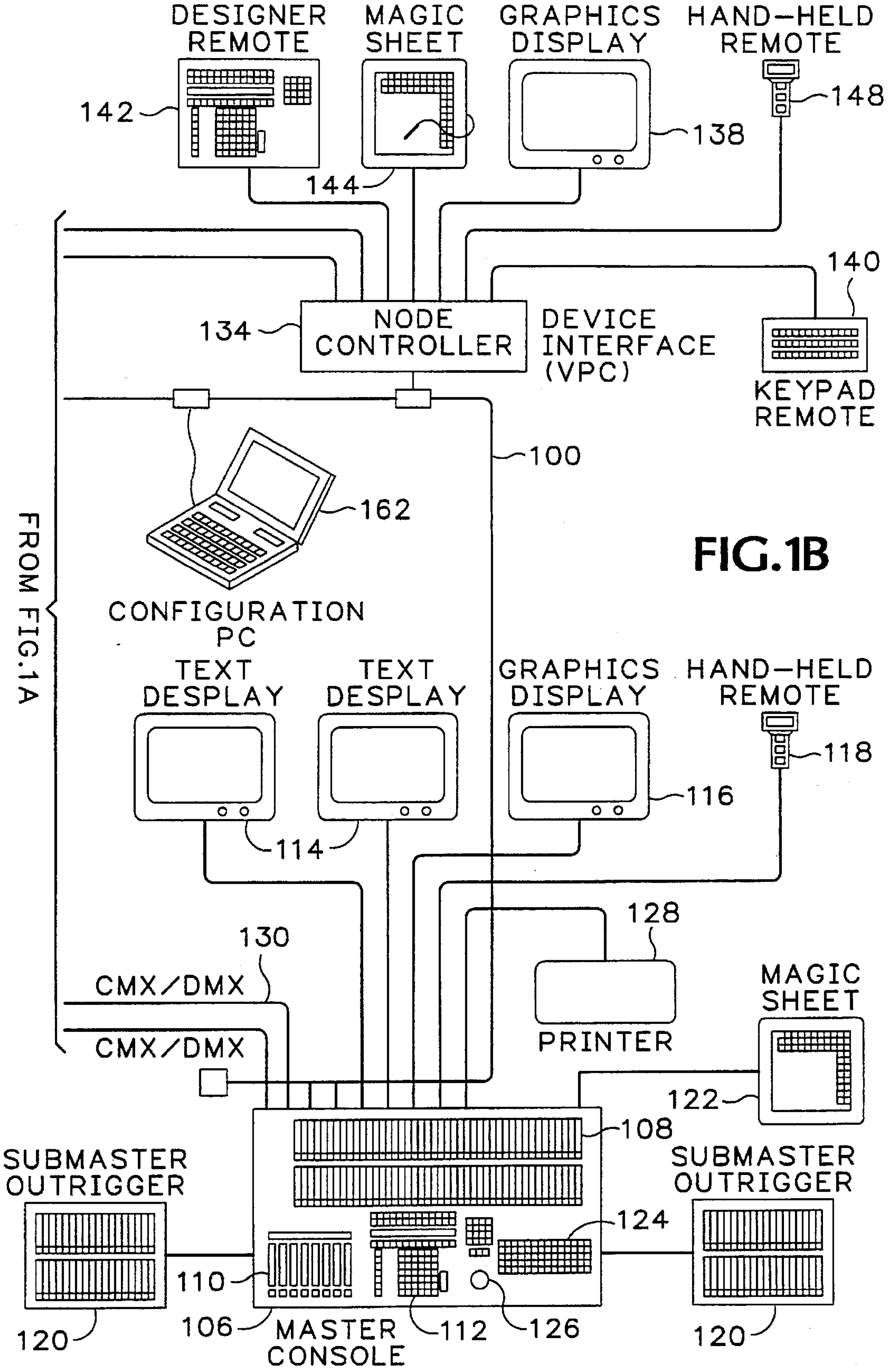

The elements of the theatrical lighting control network for a representative embodiment are shown FIG. 1. the local area network for the embodiment shown in the drawings comprises a thin Ethernet system employing coaxial cable 100, which is installed in the theater, sound stage or other application location. Medium attachment units (MAU) 102 are located throughout the cable network at desired locations to allow interfacing to the network. In the embodiment shown, the MAUs comprise standard BNC T-connectors. The LAN cable network employs standard terminators 104 to define the extent of the network.

A master console 106 is provided in the system for operator control of the various lighting systems. Standard panel operator devices, such as level slide controls 108, ganged slide controls 110 and dedicated function keys 112, are provided for control. In the embodiment shown, a standard configuration of 96 slides for individual dimmer control are provided. Status display for the operator is provided on two text displays 114, with programming and operator system information provided on graphics display 116.

Additional control input devices, such as a hand-held remote 118, submaster outrigger slide panels 120 and Magic Sheet 122, a lighting designer control tablet produced by Colortran, Inc., supplement the primary panel operator controls for the master console. Programming control and computer functions interface in the master console is provided through standard keyboard 124 and track ball 126 inputs. A printer 128 is provided for hard copy of lighting designs and other output information from the master console.

An integral LAN interface in the master console connects to the coaxial cable for data communication through the LAN. DMX/CMX outputs 130 are provided from the master console for direct hardwired connection to DMX/CMX dimmer racks 132, which are not on the network.

Additional master consoles can be incorporated into the network at desired locations for duplicate control of common dimmers or additional control of separate dimmers, as will be discussed in greater detail subsequently.

Figure 2:
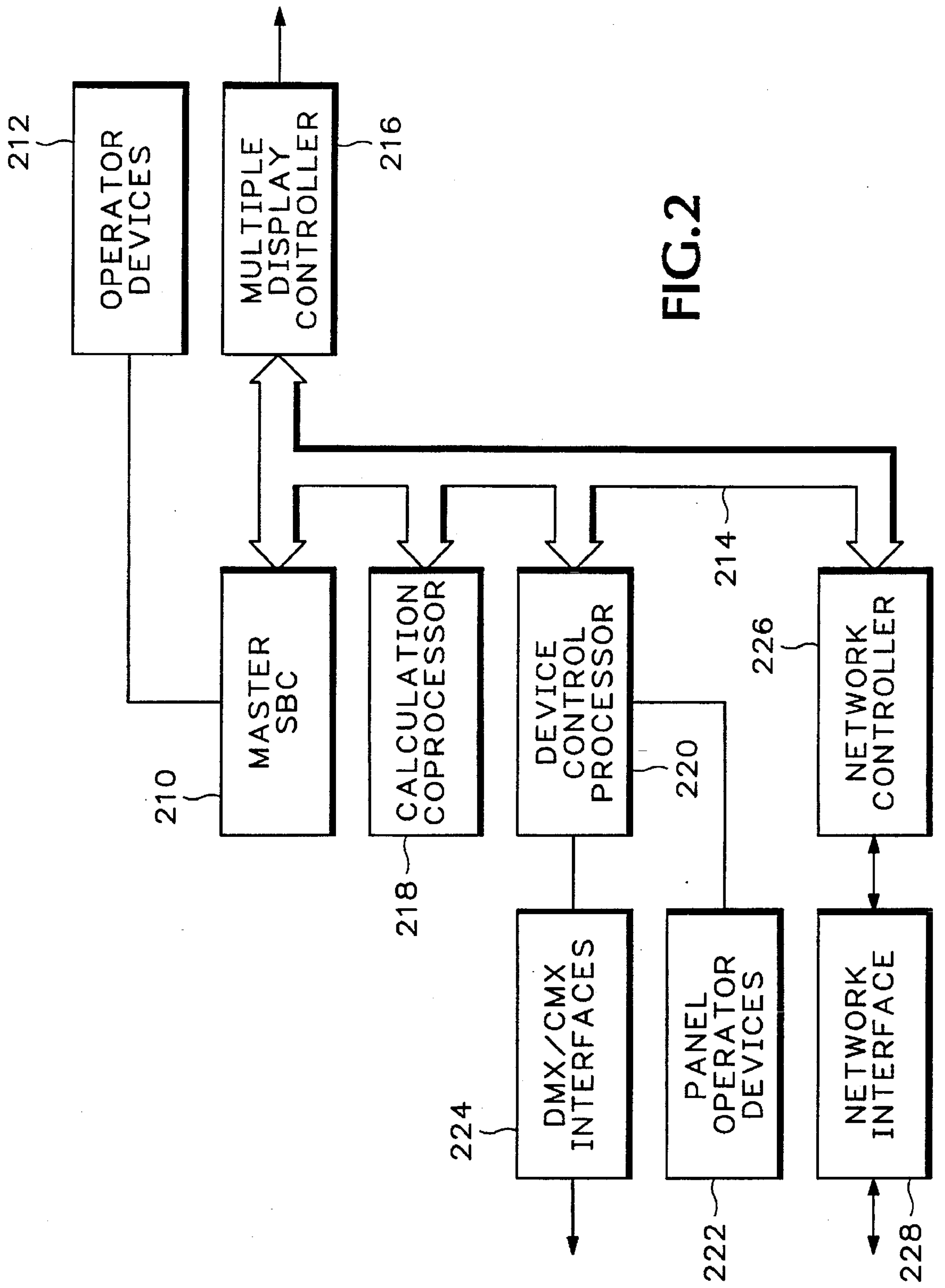
FIG. 2 is a block diagram of an exemplary master console interfacing to the network.

FIG. 2 discloses, in block diagram form, the internal configuration of an exemplary master controller. Overall operation of the master controller is accomplished through a master single-board computer (SBC) 210 incorporating a processor and integral memory. Current 486-based SBCs provide adequate capability for system requirements. Operator device interfaces 212 connect directly with the SBC for communication with programming devices, such as the standard keyboard and track ball, and supplemental external controllers and peripherals, such as the handheld remotes, Magic Sheet, and hard copy printer. A processor communications bus connects the SBC to a multiple display controller 216 for the text and graphics displays and to a calculation coprocessor 218 and device control processor 220 to supplement the processing capability of the SBC. A calculation coprocessor allows rapid computation of light levels for dimmers controlled by the master console based on the various control inputs. The device control processor provides an interface for the panel operator devices, generally designated 222, which include the slide controllers and designated function keypad inputs. In addition, direct output of DMX/CMX data is provided through the device control processor to a DMX/CMX interface 224.

A network controller 226 communicates to the SBC through the processor bus and attaches the master console to the LAN through network interface 228.

Referring again to FIG. 1, the other elements of the system are attached to the network through node controllers connected at desired locations through the BNC T-connectors. Remote monitoring and control input to the system is accomplished through peripheral node controllers (PNCs). A first PNC type specifically configured for attachment of video monitors and control devices is demonstrated in the embodiment shown in the drawings as the video peripheral controller (VPC) 134. VPCs are located on the network for use by designers, stage managers and others to monitor, control or design lighting remote from the master console. Devices supported by a VPC include remote text displays 136, remote graphic displays 138, dedicated function key input devices, such as remote keypads, 140, designer remotes 142 and Magic Sheets 144, remote submaster outriggers 146 and hand-held remotes 148. Exemplary use of the VPC would be a stage manager's booth backstage in a theater, allowing the stage manager to view lighting cues on the text display to coordinate scene cues, actor entrances, etc.

A second NPC configuration identified in the embodiment shown in the drawings constitutes an RF device interface 150, which provides communications through a radio frequency link 152 to roving design and control devices, such as Magic Sheets, designer remotes and hand-held remotes incorporating RF transceivers.

Figure 3:
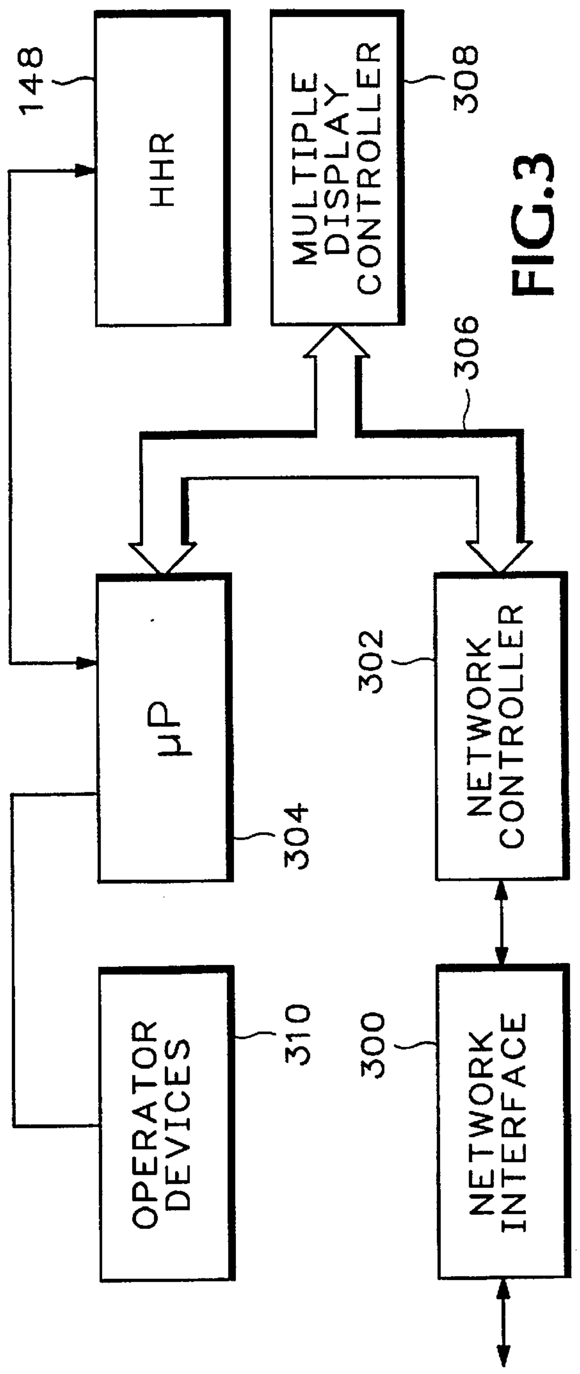
FIG. 3 is a block diagram of an embodiment of the video peripheral controller configuration for a node controller.

The internal configuration of an exemplary VPC is shown in FIG. 3. The VPC is connected to the LAN through a network interface 300, which communicates through network controller 302 to a microprocessor 304 on the microprocessor bus 306. The microprocessor controls the VPC, providing output to displays through a multiple display controller interface 308 connected to the processor bus, and providing direct connection to the hand-held remote and other operator devices, generally designated 310.

Other PNCs, such as the RF device interface, employ a similar structure to that disclosed in FIG. 3, with appropriate interface modifications, such as the addition of an RF link between the microprocessor and operator devices. Flexibility obtained through the use of a network in the present invention allows PNCs to be developed with single or plural interfaces which may be attached at any T-connector on the LAN.

Control of lighting dimmer racks in the system via the LAN is accomplished through node controllers configured as network protocol converters (NPC) 154 in FIG. 1. NPCs incorporate an integral LAN interface and provide direct DMX/CMX/AMX controller inputs. Devices such as non-networked control consoles are connected to these inputs for direct control of dimmers attached to the NPC.

Outputs from the NPC are provided to drive AMX dimmer racks 156 and CMX/DMX dimmer racks 158. The flexibility of the present system allows the use of dimmer racks of any size including standard dimmer racks having 12, 24 or 48 single or dual dimmer modules (96 dimmers per rack). The present configuration of the embodiments shown in the drawings allows designation of up to 8,192 dimmers for control on the LAN, with up to 4,096 dimmers controlled through an individual master console.

Figure 4:
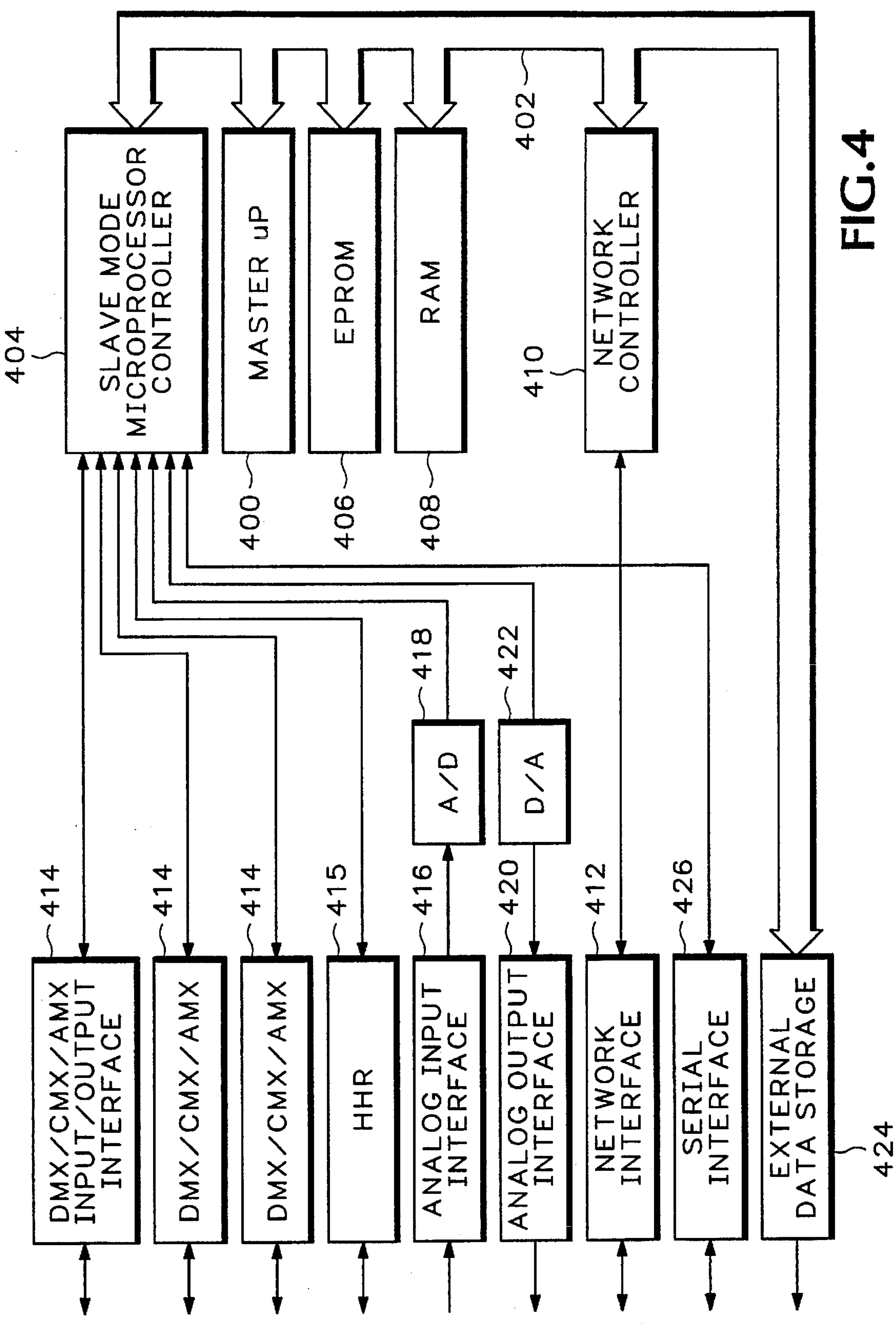
FIG. 4 is a block diagram of an embodiment for the protocol converter configuration for a node controller.

FIG. 4 demonstrates a present embodiment of the NPC. A master microprocessor 400 provides overall control of the NPC. The master microprocessor communicates through a processor bus 402 with a slave mode microprocessor controller 404. An erasable programmable read-only memory (EPROM) 406 and random access memory (RAM) 408 provide control software and operating data storage capability for the NPC. A network controller 410, connected to the bus, provides communications to the LAN through a network interface 412. Communications with the dimmers is provided through DMX/CMX/AMX input/output interfaces 414.

Additional interfaces for alternate control devices, such as a hand-held remote 415, can be incorporated in the NPC for additional local control flexibility. As previously described, direct connection of DMX/CMX/AMX control devices to these interfaces allows non-networked control inputs into the NPC. In addition, an analog input interface 416, in combination with an analog to digital converter 418 and an analog output interface 420, in combination with a digital to analog converter 422, provide direct analog input and output capability for the NPC for functional monitoring and control of the dimmer rack. In the embodiment shown in the drawings, between 8 and 24 analog inputs and outputs are provided.

The internal intelligence in the NPC provided by the master microprocessor and data storage capability allows the NPC to control complete configuration of the racks and dimmers connected to the NPC. A node name specifically identifying each NPC allows specified communication on the network and network source identification numbers of consoles or other input devices providing dimmer data input to the NPC are stored in memory. In the embodiment shown in the drawings, up to 16 controllers may be present on the network, providing 16 I.D.'s for controller definition to the NPC. Availability of the dimmer data inputs for access by a controller and enabled/busy status for the inputs allows control of data received over the LAN by the NPC. Protocol types for the various control inputs are established, and source I.D.'s and priorities for "pile-on" of control data for the dimmers is provided. In the embodiment shown in the drawings, up to 7 DMX/CMX controllers, including both LAN and direct input to the NPC, can be piled-on with priority. Each controller in the system is given a priority of 5-to-1, or 0, with 5 being highest priority. Controllers with the same priority pile-on and ignore contributors of a lower priority. Priority 0 always piles-on for control selection.

Multiple profile definitions for dimmers in the rack are stored and identified in memory for selection for individual dimmers. Rack level control parameters are provided through the analog input interface to the NPC with control outputs, such as fan activation, through the analog output interface.

Individual dimmer parameters such as dimmer capacity and confituration are stored in memory in the NPC and individual dimmers may be named per dimmer circuit. A remap table for logical-to-physical definition of the dimmers in the rack is stored. Individual dimmer parameters, such as target load, line regulation, cable resistance, response time, minimum and maximum values, phase control parameters, dimmer profile and dimmer alarm settings (over-temperature and load sensing) are stored for each dimmer.

The NPC incorporates an external data storage interface 424 connected to the microprocessor bus for uploading and downloading NPC configuration to non-volatile storage, such as a memory card or magnetic disk system. A serial interface 426 is provided in the NPC for direct connection of a personal computer or other device for configuration definition, as will be described in greater detail subsequently.

The data contained in the NPC may be monitored and/or updated through the LAN. This allows operators, designers, stage managers and others to receive direct feedback regarding operation of dimmers in the system. The flexibility afforded by the LAN in distribution of dimmer control data is also equally applicable to system feedback, which can be obtained at any LAN-connected console or VPC.

Exemplary feedback parameters provided through the LAN for monitoring in the system include individual dimmer name, control level (0–100%), output voltage, low load condition, overtemp condition and dimmer type.

Memory capability in the NPC allows storage of a plurality of "looks" as previously described. Settings for the full compliment of dimmers controlled through the NPC are stored. In the present embodiment shown in the drawings, storage capacity for 99 "looks" is provided. The master microprocessor in the NPC monitors control data provided by the LAN and/or local controllers. Upon loss of signal from the controllers, the microprocessor automatically institutes a preprogrammed "look." Access to other "looks" stored in the memory can then be accomplished through a local controller, such as the hand-held remote. Changes between "looks" are automatically formatted by the NPC based on the dimmer parameters previously described.

Figure 5:
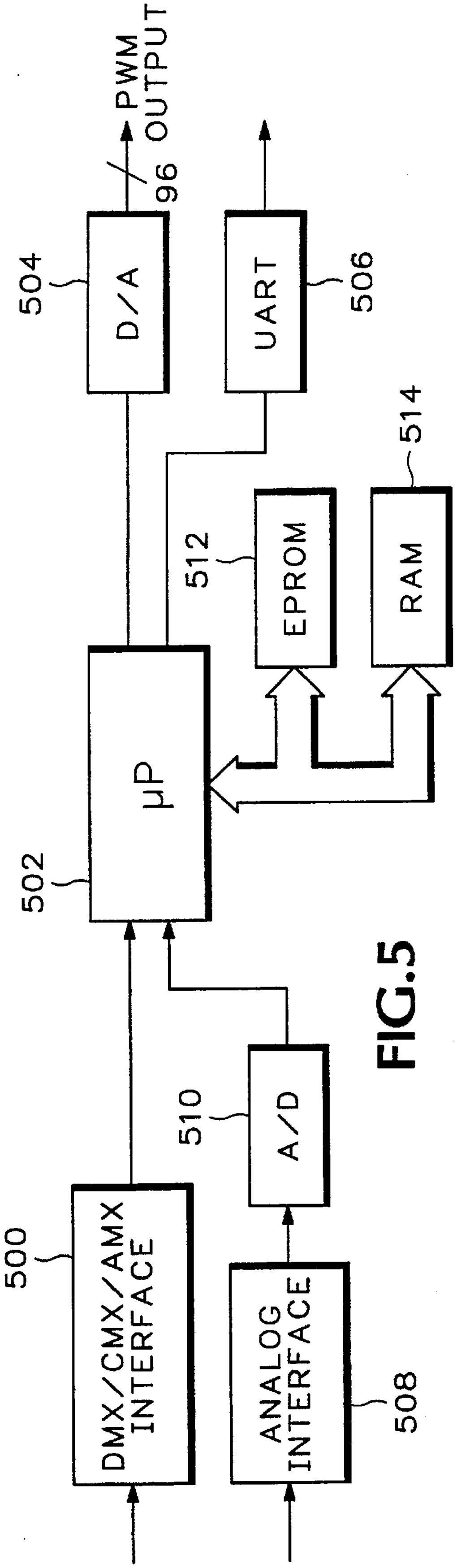
FIG. 5 is a block diagram of a standard dimmer rack interface.

An exemplary embodiment for the dimmer racks used in the system is shown in FIG. 5. Dimmer data input to the rack is received on a DMX/CMX/AMX interface 500 connected to a microprocessor 502. The microprocessor decodes the dimmer data received and provides output to the dimmers through a digital-to-analog converter 504, providing direct pulse width modulation (PWM) output for "dumb" dimmers or through a universal asynchronous receiver/transmitter (UART) 506 for data transmission to "smart" dimmers. An analog interface 508, with associated A-to-D converter 510, is provided for input of analog configuration or control parameters to the rack. Program and data storage for the microprocessor is provided in EPROM 512 and RAM 514.

The configuration of the node controllers of the system is accomplished through the use of a personal computer 162 attached to the network as shown in FIG. 1. Definition of all parameters and settings for each NPC are determined and entered into the PC prior to operation of the networked lighting system. The node configurations are then downloaded either through the LAN to the various nodes or the PC is individually attached to each node through the serial port and the node is preconfigured prior to attachment to the LAN.

In the embodiment disclosed herein, the necessary configuration settings of an NPC are the network name, dimmer source IDs of node input ports and Master Console dimmer data, pile-on assignments of output ports, remap assignments of source ID dimmers to output dimmers, DMX/CMX/AMX input protocol timing and enabling, and DMX/

CMX/AMX output protocol timing and enabling. The only necessary configuration setting of a VPC is the network name.

Figure 6:
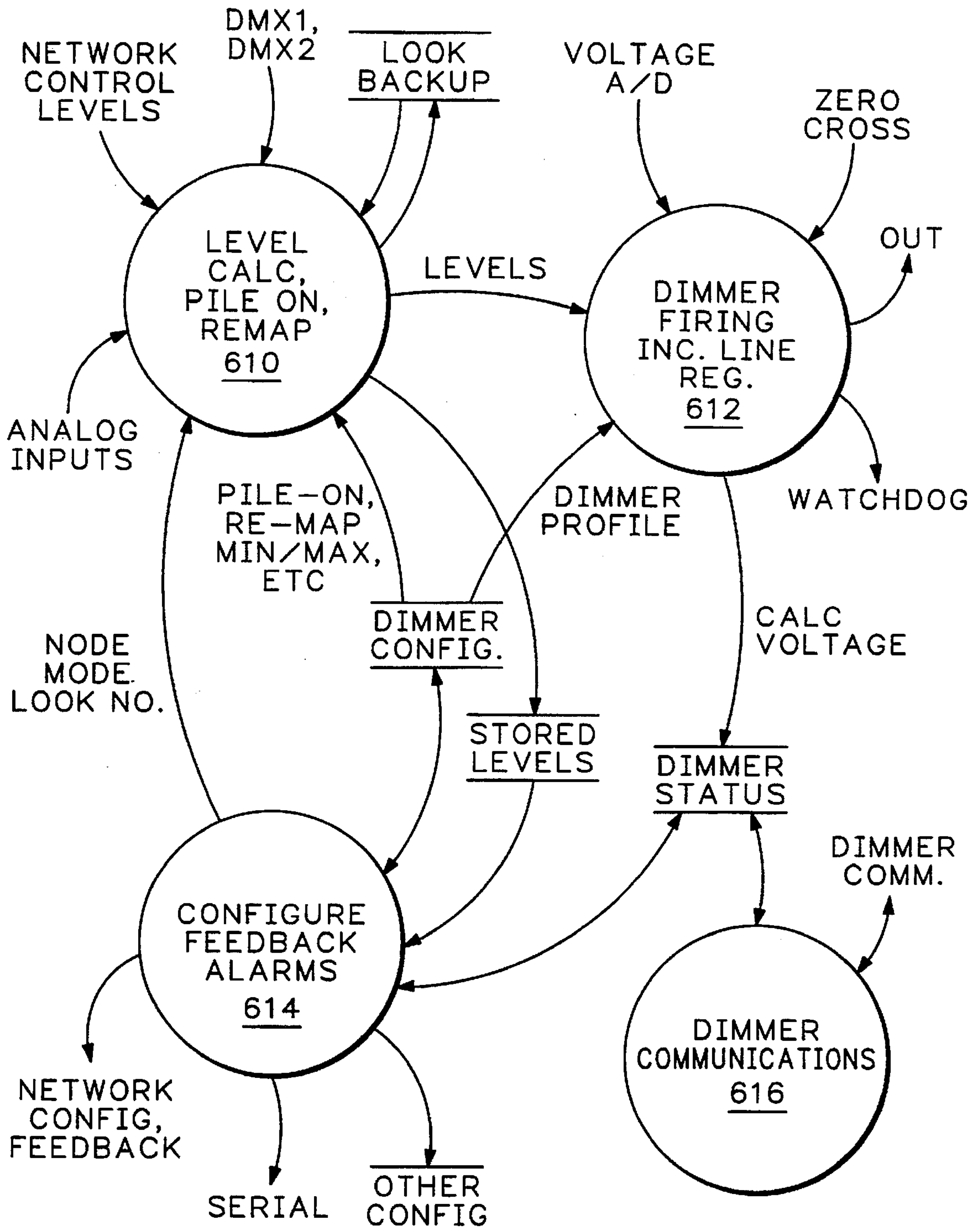
FIG. 6 is a software flow diagram for the elements of a protocol converter.
Figure 7:
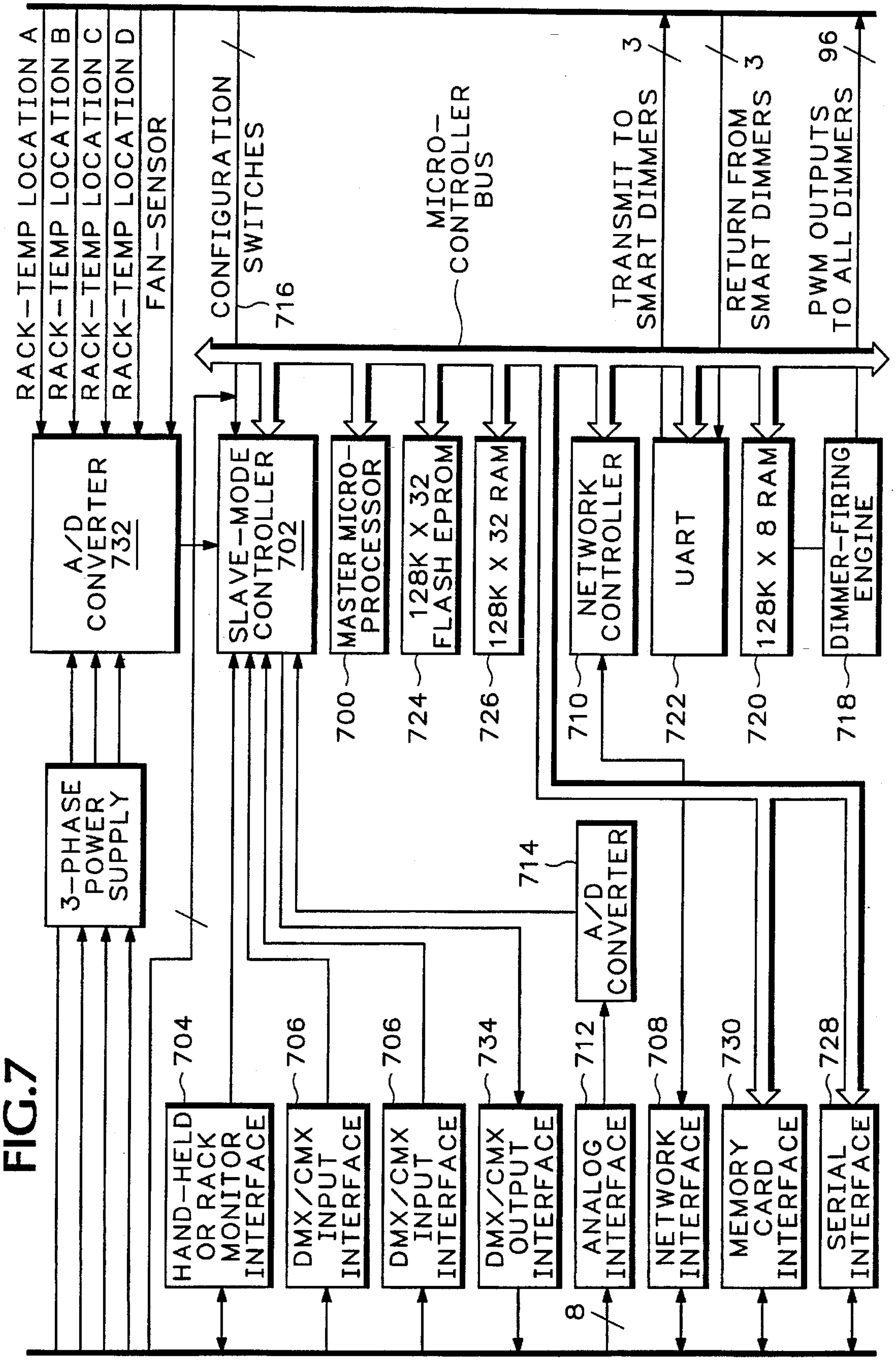
FIG. 7 is a block diagram of a networked dimmer rack with an integral protocol converter.

FIG. 7 discloses, in block diagram form, an integration of the NPC into the dimmer rack. Dimmer racks with integrated nodes 160 for direct connection to the LAN as shown on FIG. 1 employ the architecture of the embodiment shown in FIG. 7. The functions of the master microprocessor and slave mode controller of the NPC of FIG. 6 are duplicated by the master microprocessor 700 and slave mode controller 702, with the master microprocessor controller additionally assuming the functions of the microprocessor 500 of the rack in FIG. 5. A device interface 704 for hand-held remote or rack monitor provides direct communication to and from the integrated rack, with control level inputs received through DMX/CMX input interfaces 706 or through the LAN via the network interface 708 and network controller 710, which is attached to the microcontroller bus for direct communication to the master microprocessor. An analog interface 712 and associated A-to-D converter 714 provide analog input to the slave mode controller for control functions. Multiple hardwired configuration switches located internal or external to the rack connect to signal lines 716 feeding direct configuration data to the slave mode controller.

Presence of the NPC integral with the rack precludes the need for intermediate communications from the NPC to the rack via DMX/CMX protocols. The master microprocessor provides direct output to a dimmer firing engine 718 with associated memory 720 for output of PWM data to "dumb" dimmers. Similarly the master microprocessor provides data directly to UART 722 for control of "smart" dimmers which, in turn, provide return communications through the UART to the master microprocessor.

The memories 724 and 726, serial interface 728 and external data storage interface 730 have similar functions to the NPC components described with regard to FIG. 4.

The slave mode controller and master microprocessor of the integrated rack provide sensing of power, temperatures and fan condition through A/D converter 732 and can provide that status data to the network.

Finally, the integrated rack provides a control output as a NPC for a companion standard DMX/CMX rack through DMX/CMX output interface 734.

A functional diagram of software for an NPC of the embodiments in the drawings providing control to dimmer racks 160 of FIG. 1 and illustrated in FIG. 7, is shown in FIG. 6. The bubbles in FIG. 6 identify the processes of the software, while arrows in the figure show data flow and hash-lined descriptions designate data storage. The initial process identified as LEVEL CALCULATION, PILE-0N AND REMAP 610 receives inputs from the DMX direct connection consoles, NETWORK CONTROL LEVELS from the master console on the LAN and other ANALOG INPUTS. The LEVEL CALCULATION calculates the desired level for each controllable element in the system from the inputs and, based on the PILE-ON, REMAP, MIN./MAX. and other data contained in the DIMMER CONFIGURATION data. The output of defined levels is provided to the DIMMER FIRING PROCESS, INCLUDING LINE REGULATION subroutine 612, which applies the DIMMER PROFILE provided from the DIMMER CONFIGURATION data based on the current line status identified by VOLTAGE A/D and ZERO CROSS data about the line. The calculated values are then output (OUT) to the rack for implementation. The CALCULATED VOLTAGES are also stored as DIMMER STATUS, and LEVELS provided from the level calculation are placed in memory as STORED LEVELS for operation by the CONFIGURE FEEDBACK AND ALARM subroutine 614, which provides data to the network for configuration and feedback and to the serial output for communication to the configuration PC. A DIMMER COMMUNICATION subroutine 616 receives additional dimmer status communications (DIMMER COMM) from the rack and provides interactive communications to "smart" dimmers for information other than level data.

The CONFIGURE FEEDBACK AND ALARMS subroutine also receives input from the LAN or serial port for defining configuration of the NPC (NODE), mode of operation (MODE) or "look" data (LOOK NO.), which may be employed by the LEVEL CALCULATION, PILE-ON AND REMAP subroutine for generation of stored "looks". Analog inputs to the LEVEL CALCULATION, PILE-ON AND REMAP subroutine may also be employed for "look" selection or back-up from LOOK BACKUP data in memory, based on failure of DMX direct or network control level input.

While the embodiments herein disclose lighting controls such as dimmers, controllers for other stage effects such as wind machines, movable light carriages and active stage props are operable with the network as defined in the present invention. Having now described the invention in detail as required by the patent statutes, those skilled in the art will recognize substitutions and modifications to the embodiments disclosed herein for specific applications of the invention. Such substitutions and modifications are within the scope and intent of the present invention as defined by the following claims.

What is claimed is:

1. A theatrical lighting control network consisting of:

a single local area network (LAN) having a plurality of connection points for a structure of control devices, peripheral devices and effect control elements, said structure comprising:

a control console having input controls for operation to define desired settings of a plurality of effect control elements, the console further having an interface means connected to the LAN for transmitting the settings to the LAN;

at least two node controllers connected to the LAN including at least one first node controller connected as a peripheral node controller, said peripheral node controller having an interface for connection of a peripheral device remote from the control console, and, at least one second node controller connected as a node protocol converter having a means for receiving settings transmitted through the LAN, at least one means for translating the settings to a control protocol, and means for transmitting the control protocol on an output; and at least one rack of a plurality of effect control elements connected to the output of the at least one node protocol converter and receiving the control protocol for operation of the effect control elements.

2. A theatrical lighting and control network as defined in claim 1 wherein the node protocol converter further includes:

a means for receiving non-networked effect settings; and a means for controlling pile-on of effect settings received over the network and the non-networked effect settings.

3. A theatrical lighting and control network as defined in claim 1 wherein the peripheral node controller is a video peripheral controller and the peripheral device comprises a remote video display.

4. A theatrical lighting and control network as defined in claim 3 wherein the video peripheral controller further has a second interface for connection of a remote control device having means for defining desired effect settings, said second interface including means for transmitting said desired effect settings to the LAN and means for transmitting a predetermined priority for the remote control device to the LAN, and wherein the at least one second node controller includes means for interpreting said predetermined priority for pile-on of effects settings.

5. A theatrical lighting control network consisting of:

a single local area network (LAN) having a plurality of connection points for a structure of control devices, peripheral devices and effect control elements, said structure comprising:

a control console having input controls for operation to define desired settings of a plurality of effect control elements, the console further having an interface means connected to the LAN for transmitting the settings to the LAN;

a plurality of node controllers connected to the LAN including a first plurality of node controllers connected as peripheral node controllers, said peripheral node controllers each having an interface for connection of a peripheral device remote from the control console and means for transmitting effect settings and a predetermined priority level, and, a second plurality of node controllers connected as node protocol converters having a means for receiving settings transmitted through the LAN, means for determining priority of the settings received based on said predetermined priorities transmitted on the LAN, at least one means for translating the settings to a control protocol, and a means for transmitting the control protocol on an output; and a plurality of racks, each containing a plurality of effect control elements, each connected to the output of one of said second plurality of node protocol converters and receiving the control protocol for operation of the effect control elements.

6. A theatrical lighting control network as defined in claim 5 wherein each of the node protocol converters further includes:

a means for receiving effect settings from a controller connected directly to the node protocol converter; and a means for controlling pile-on of effect settings received over the network based on transmitted priority and the effect settings from the directly connected controller.

7. A node protocol converter, for use in theatrical lighting and control employing a single local area network (LAN) for common communication between a plurality of node protocol converters and multiple control consoles and peripheral controllers, comprising:

a communications interface connected to the LAN;

memory means for storing parameters and protocol information for operation of a rack of a plurality of effect control elements;

a controller connected to the communications interface and receiving effect settings from said multiple control consoles and peripheral controllers connected to the LAN, said controller connected to the memory means and having means for receiving a predetermined priority from said consoles and peripheral controllers, and means for operating on said effect settings based on said priority with said parameters and protocol information to establish an output protocol;

a means for receiving non-networked effect settings, said controller further including means for controlling pile-on of effect settings received over the LAN and the non-networked effect settings; and an output interface connected between the controller and the rack for providing the output protocol to the effect control elements of the rack.

8. An integrated effects rack and node protocol converter, for use in theatrical lighting and control employing a single local area network for common communication between a plurality of node protocal converters and multiple control consoles and peripheral controllers, comprising:

a communications interface connected to the local area network;

memory means for storing parameters and protocol information for operation of a rack of a plurality of effect control elements;

a controller connected to the communications interface and receiving effect settings from said multiple control consoles and peripheral controllers connected to the network, said controller connected to the memory means and having means for receiving a predetermined priority from said consoles and peripheral controllers, and means for operating on said effect settings based on said priority with said parameters and protocol information to establish effect control levels; and a plurality of effect control elements connected to the controller and receiving the effect control levels.

9. A theatrical lighting control network consisting of:

a single local area network (LAN) having a plurality of connection points for a structure of control devices, peripheral devices and effect control elements, said structure comprising:

at least two node controllers connected to the LAN, at least a first one of said node controllers having means for connection of a standard protocol control console having input controls for operation to define desired settings of a plurality of effect control elements and means for transmitting the desired settings to the LAN with a predetermined priority, at least a second one of said node controllers having a means for receiving settings transmitted through the LAN, means for determining priority of the received settings, at least one means for translating the settings to a control protocol, and means for transmitting the control protocol as an output; and at least one rack of a plurality of effect control elements connected to the output of the at least a second one of said node protocol converters and receiving the control protocol for operation of the effect control elements.

* * * * *